US012538127B2

(12) United States Patent
 Khare et al.

(10) Patent No.: US 12,538,127 B2
(45) Date of Patent: Jan. 27, 2026

(54) ROGUE NETWORK FUNCTION RE-AUTHORIZATION IN A COMMUNICATION NETWORK

(71) Applicant: Nokia Technologies Oy, Espoo (FI)

(72) Inventors: Saurabh Khare, Bangalore (IN); Narasimha Rao Pulipati, Redmond, WA (US); Suresh Nair, Estero, FL (US)

(73) Assignee: Nokia Technologies Oy, Espoo (FI)

( * ) Notice: Subject to any disclaimer, the term of this patent is extended or adjusted under 35 U.S.C. 154(b) by 397 days.

(21) Appl. No.: 18/006,248

(22) PCT Filed: Jul. 14, 2021

(86) PCT No.: PCT/IB2021/056352
§ 371 (c)(1),
(2) Date: Jan. 20, 2023

(87) PCT Pub. No.: WO2022/018581
PCT Pub. Date: Jan. 27, 2022

(65) Prior Publication Data
US 2023/0292131 A1    Sep. 14, 2023

(30) Foreign Application Priority Data
Jul. 24, 2020    (IN) .............................. 202041031731

(51) Int. Cl.
*H04W 12/122*    (2021.01)
*H04W 12/00*    (2021.01)
*H04W 12/06*    (2021.01)

(52) U.S. Cl.
CPC ......... *H04W 12/122* (2021.01); *H04W 12/00* (2013.01); *H04W 12/06* (2013.01)

(58) Field of Classification Search
CPC .... H04W 12/00; H04W 12/06; H04W 12/122
See application file for complete search history.

(56) References Cited

U.S. PATENT DOCUMENTS 10,492,071 B1 * 11/2019 Havaralu Rama Chandra Adiga ................. H04W 12/082
2006/0161980 A1    7/2006 Huitema et al.
(Continued)

FOREIGN PATENT DOCUMENTS

WO    2021/260630 A1    12/2021

OTHER PUBLICATIONS

"3rd Generation Partnership Project; Technical Specification Group Services and System Aspects; Security architecture and procedures for 5G system (Release 16)", 3GPP TS 33.501, V16.2.0, Mar. 2020, pp. 1-227.

(Continued)

*Primary Examiner* — Jeong S Park
(74) *Attorney, Agent, or Firm* — Barta Jones, PLLC

(57) ABSTRACT

Techniques for preventing rogue network functions in a communication network are provided. For example, a method comprises obtaining information identifying one or more network entities suspected of malicious activity operating within the communication network, causing a re-authorization of the one or more network entities suspected of malicious activity, and in response to a re-authorization failure of at least one of the one or more network entities suspected of malicious activity, causing one or more remedial actions to occur within the communication network to prevent the at least one network entity that failed re-authorization from accessing other network entities in the communication network.

6 Claims, 4 Drawing Sheets

(56) References Cited

U.S. PATENT DOCUMENTS

| | | | |
|---|---|---|---|
| 2014/0040997 A1* | 2/2014 | Anantharaju | G06F 21/575 |
| | | | 726/5 |
| 2015/0237502 A1 | 8/2015 | Schmidt et al. | |
| 2016/0173495 A1* | 6/2016 | Joo | H04L 63/1425 |
| | | | 713/171 |
| 2019/0116051 A1* | 4/2019 | Rome | H04L 63/083 |
| 2021/0152554 A1* | 5/2021 | Taft | H04L 41/0895 |
| 2021/0377054 A1* | 12/2021 | Mahajan | G06F 9/455 |
| 2022/0200966 A1* | 6/2022 | de-Gregorio-Rodriguez | |
| | | | H04L 63/0281 |
| 2022/0232460 A1* | 7/2022 | Fu | H04W 12/10 |
| 2022/0295386 A1* | 9/2022 | Lu | H04L 67/51 |

OTHER PUBLICATIONS

Jones et al., "JSON Web Signature (JWS)", RFC 7515, Internet Engineering Task Force (IETF), May 2015, pp. 1-59.

Jones et al., "JSON Web Encryption (JWE)", RFC 7516, Internet Engineering Task Force (IETF), May 2015, pp. 1-51.

Fielding et al., "Hypertext Transfer Protocol (HTTP/1.1): Message Syntax and Routing", RFC 7230, Internet Engineering Task Force (IETF), Jun. 2014, pp. 1-89.

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

"3rd Generation Partnership Project; Technical Specification Group Core Network and Terminals; 5G System; Authentication Server Services; Stage 3 (Release 16)", 3GPP TS 29.509, V16.4.0, Jun. 2020, pp. 1-60.

"3rd Generation Partnership Project; Technical Specification Group Core Network and Terminals; 5G System; Network Function Repository Services; Stage 3 (Release 16)", 3GPP TS 29.510, V16.4.0, Jul. 2020, pp. 1-192.

International Search Report and Written Opinion received for corresponding Patent Cooperation Treaty Application No. PCT/IB2021/056352, dated Oct. 8, 2021, 11 pages.

* cited by examiner

ROGUE NETWORK FUNCTION RE-AUTHORIZATION IN A COMMUNICATION NETWORK

RELATED APPLICATION

This application was originally filed as PCT Application No. PCT/IB2021/056352, filed on Jul. 14, 2021, which claims priority from IN application No. 202041031731, filed on Jul. 24, 2020, each of which is incorporated herein by reference in its entirety.

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," the disclosure of which is incorporated by reference herein in its entirety. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with malicious (rogue) actors can present a significant challenge.

SUMMARY

Illustrative embodiments provide techniques for preventing rogue network functions in a communication network.

For example, in one illustrative embodiment, a method comprises obtaining information identifying one or more network entities suspected of malicious activity operating within the communication network, causing a re-authorization of the one or more network entities suspected of malicious activity, and in response to a re-authorization failure of at least one of the one or more network entities suspected of malicious activity, causing one or more remedial actions to occur within the communication network to prevent the at least one network entity that failed re-authorization from accessing other network entities in the communication network.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/ functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 5G TS 29.509, entitled "Technical Specification Group Core Network and Terminals; 5G System; Authentication Server Services" and 5G TS 29.510, entitled "Technical Specification Group Core Network and Terminals; 5G System; Network Function Repository Services," the disclosures of which are incorporated by reference herein in their entireties, are mentioned below in the context of some illustrative embodiments.

However, while well-suited for 5G-related 3GPP standards, embodiments are not necessarily intended to be limited to any particular standards.

Illustrative embodiments are related to service authorization in 5G networks. Prior to describing such illustrative embodiments, a general description of main components of a 5G network will be described below in the context of FIGS. 1 and 2.

Figure 1:
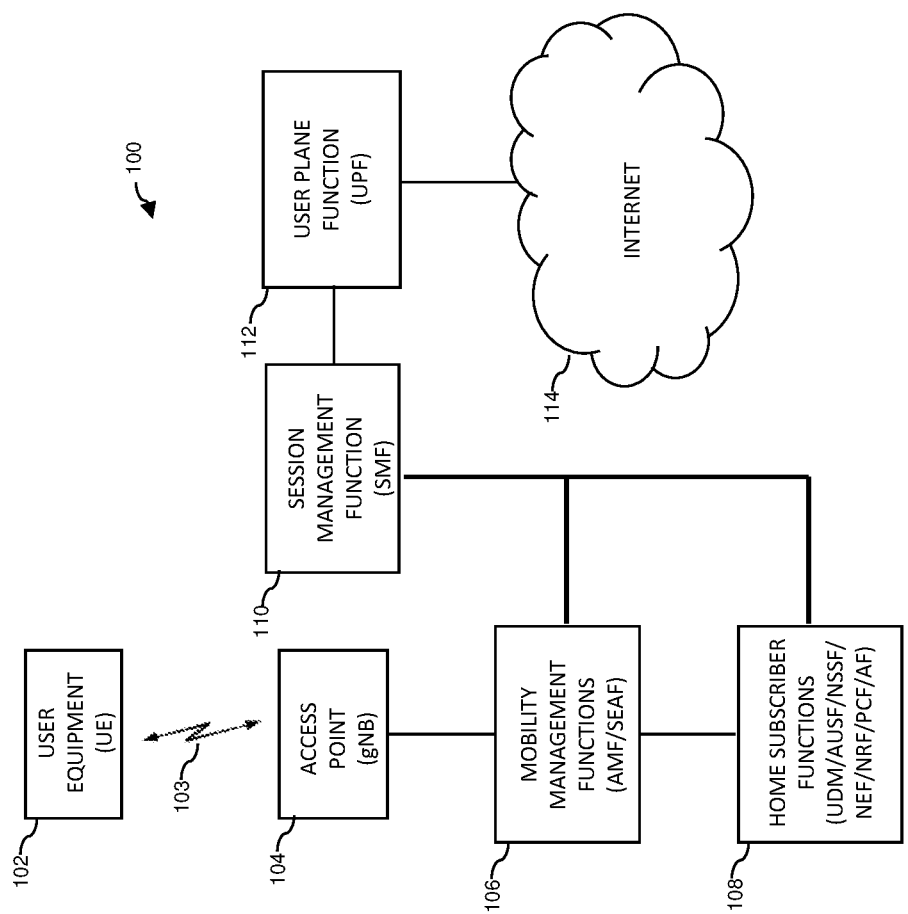
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
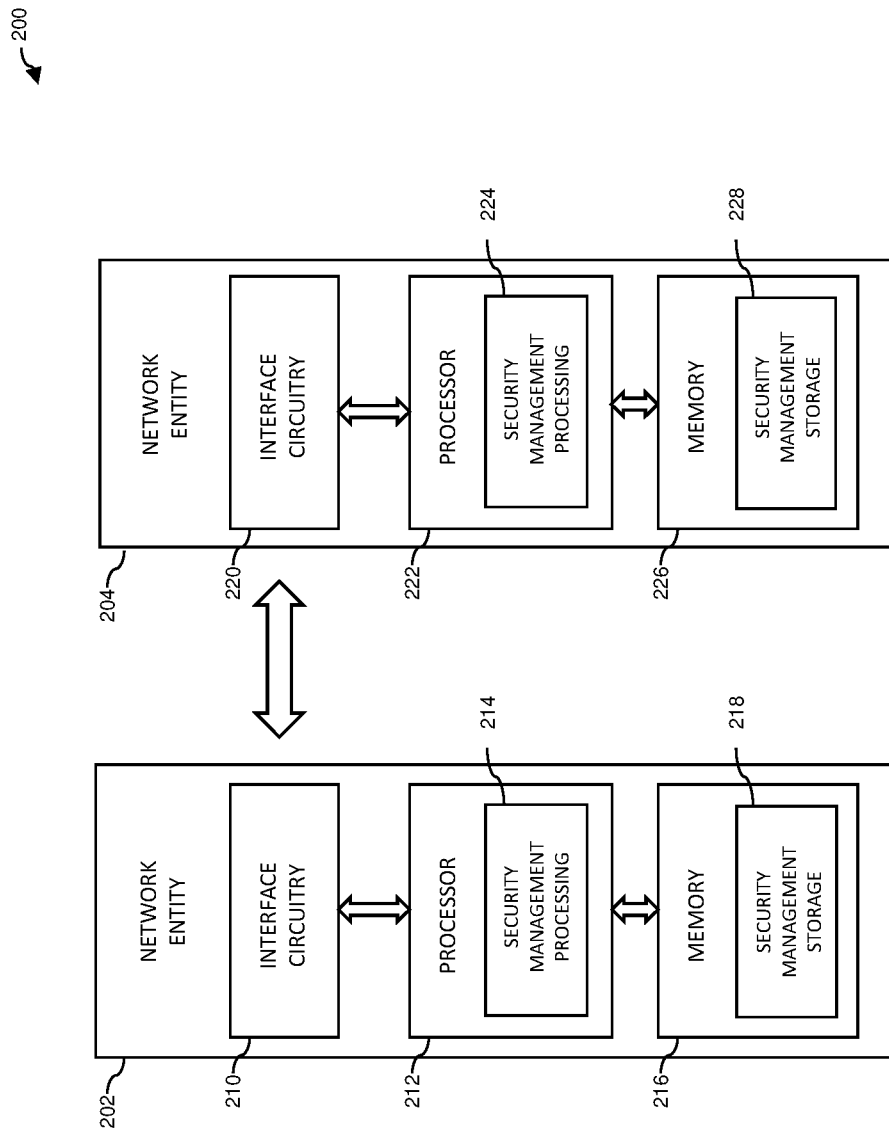
FIG. 2 illustrates network entities with which one or more illustrative embodiments may be implemented.

FIG. 2 is a block diagram of network elements/functions for providing authorization in a service communication proxy in a communication system in an illustrative embodiment. System 200 is shown comprising a first network entity 202 and a second network entity 204. It is to be appreciated that the network entities 202 and 204 represent any network entities (network functions, nodes, components, elements, services, etc.) that are configured to provide security management and other techniques described herein, for example, but not limited to, AMF, SEAF, UDM, AUSF, NSSF, NEF, NRF, PCF and AF such as are part of an SBA-based 5G core network (which is part of an HPLMN, VPLMN, or both). Further, one or both of the first network entity 202 and the second network entity 204 may also represent a Service Communication Proxy (SCP) element. Still further, one or both of the first network entity 202 and the second network entity 204 may also represent a Secure Edge Protection Proxy (SEPP) element. Details about the SCP and SEPP are described in the above-referenced and other corresponding 3GPP Technical Specifications.

Further, network entity 202 or 204 can be a network function, node, component, element, service, etc., external to the SBA-based 5G core network, i.e., a third-party external enterprise network.

Still further, network entity 202 and/or 204 can represent one or more processing devices configured to orchestrate and manage instantiation of one or more network functions (or other security management entities) within an SBA-based 5G core network or any communication network. Instantiation of a network function is described in the various 3GPP standards and otherwise well known to those of ordinary skill in the art.

The network entity 202 comprises a processor 212 coupled to a memory 216 and interface circuitry 210. The processor 212 of the network entity 202 includes a security management processing module 214 that may be implemented at least in part in the form of software executed by the processor. The processing module 214 performs operations associated with security management as described in conjunction with subsequent figures and otherwise herein. The memory 216 of the entity 202 includes a security management storage module 218 that stores data generated or otherwise used during security management operations.

The network entity 204 comprises a processor 222 coupled to a memory 226 and interface circuitry 220. The processor 222 of the network entity 204 includes a security management processing module 224 that may be implemented at least in part in the form of software executed by the processor 222. The processing module 224 performs operations associated with security management as described in conjunction with subsequent figures and otherwise herein. The memory 226 of the network entity 204 includes a security management storage module 228 that stores data generated or otherwise used during security management operations.

The processors 212 and 222 of the respective network entities 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments. In addition, illustrative embodiments may be realized in a completely virtualized environment using software, running on a cloud platform, to emulate the various network functions.

The memories 216 and 226 of the respective network entities 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory.

The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network entities 202 and 204 illustratively comprise transceivers or other communication hardware or firmware that allows the associated system elements to communicate with one another in the manner described herein.

It is apparent from FIG. 2 that network entity 202 is configured for communication with network entity 204 and vice-versa via their respective interface circuitries 210 and 220. This communication involves network entity 202 sending data to the network entity 204, and the network entity 204 sending data to the network entity 202. However, in alternative embodiments, other network elements may be operatively coupled between the network entities 202 and 204. The term "data" as used herein is intended to be construed broadly, so as to encompass any type of information that may be sent between network entities including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network entity can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Figure 3:
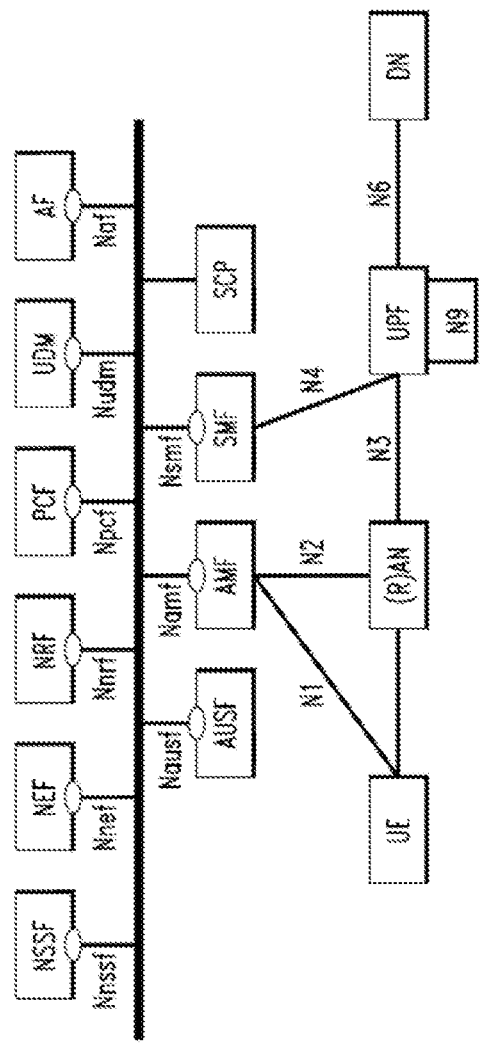
FIG. 3 illustrates a service-based architecture for a communication system within which one or more illustrative embodiments may be implemented.

The architecture for 5G systems is currently being standardized in 3GPP. As mentioned above, the 3GPP TS 23.501 defines the 5G system architecture as service-based, e.g., Service-Based Architecture (SBA). FIG. 3 illustrates a general 5G SBA implementation 300 as further described in 3GPP TS 23.501. Note that the network elements/functions in FIG. 3 are the same or similar to those described above in the context of FIGS. 1 and 2. The notation of a capital "N" in front of the network entity name (e.g., Nausf) denotes the SBA-based interface within the core network used to access the particular network entity (e.g., AUSF).

It is realized herein that in deploying different NFs, as depicted in FIG. 3, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, AUSF may need to interact with an authentication, authorization, and accounting (AAA) server managed by a third-party enterprise ("third-party" here illustratively refers to a party other than the network operator of the SBA-based 5G core network). Using conventional 5G approaches, this results in AUSF supporting multiple services both internally and externally at the same time. Internally, AUSF may provide services to AMF, SMF, NEF, UDM, etc., while at the same time interacting with an external AAA server (e.g., an external NF configured for network slice authentication) which may be owned and operated by a third-party entity. More generally, in a 5G core network, each NF provides a defined set of services (acting as service producers) to other NFs (service consumers). Each NF can be a service producer for one service and service consumer for another service.

Conventionally, the core network of a PLMN comprising different network functions is considered secure because it is managed by the PLMN operator at a central physically secure location, with each of the network functions implemented in discreet standalone boxes. However, with the advent of 5G, the core network functions are expected to be virtualized entities running on cloud platforms. These cloud platforms may be owned and operated by the PLMN operator himself or may be run on commercial public cloud platforms such as, by way of example only, an Amazon® (Seattle, WA) cloud platform and/or a Microsoft Azure® (Redmond, CA) cloud platform. In such cloud platforms, there could be multiple enterprise tenants running multiple virtual machines (VM) on the same hardware and software infrastructure. These cloud platforms may be attacked (hacked) by malicious actors to host rogue NFs. It is realized herein that it would be desirable for the core network to be able to detect and defend against such rogue NFs.

For example, when any NF detects a Denial of Services (DoS) attack or any suspicious behavior from a peer NF/IP (Internet Protocol)/network, the receiver NF tries to defend itself via blocking the connection, blocking the sender NF, etc. There can be multiple scenarios for the attack whereby the rogue NF sends one or more messages with a malicious intent and/or malicious activity (considering a Transport Layer Security (TLS) connection between the sender NF and the receiver NF is successfully established):

1) Suspicious rogue (sender) NF may create X number of connections within Y time window at the (receiver) NF which is more than the configured threshold connection.
2) Suspicious rogue (sender) NF may send junk data to the NF, i.e., incorrect messages having unexpected content types.
3) Suspicious rogue (sender) NF may use the expired or invalid token for each incoming request which causes failures at the NF (more than the configured threshold).
4) Suspicious rogue (sender) NF continuously sends more messages than the capacity or load indicated in NF Profile.
5) Suspicious rogue (sender) NF sends huge sized payloads in single requests to block network resources and cause congestion.
6) Suspicious rogue (sender) NF replay sends traffic mostly causing failure in processing due to unidentified subscribers or contexts.
7) Suspicious rogue (sender) NF continuously sends one or more messages to the wrong port number of the NF receiver on which a sender is not allowed to send.

For example, assume an NFc is not behaving properly but rather is suspected of malicious activity (rogue) in that it keeps pumping messages towards a given NFp. The NFp detects the attack based on a local policy and blacklists the NFc so that further communication from NFc is blocked at the given NFp. Thus, as the NFc is blacklisted, the problem is solved at the given NFp. However, other NFs in an operator network or PLMN are still at risk as the rogue NFc can still attack another NF and cause significant damage to the entire network. Accordingly, when a receiver NF blocks another sender NF based on suspected malicious intent/activity, proposals have been provided such that this information about the suspicious NF is shared with the network (e.g., NRF and/or Network Data Analytics Function (NWDAF), or possibly in some alternative manner).

However, there is no mechanism available in current 3GPP specifications for the network (e.g., one or more network entities) to challenge the NF performing any suspicious activity to confirm if it is a rogue NF or not, or even a software corruption or configuration mismatch that occurred at the NF causing it to behave randomly, and then have one or more network entities take action and/or inform NFs, operations, administration and management (OAM) nodes and/or network operators to take action, e.g., block or delete a rogue NF at a network level so that (further) attacks can be prevented.

Illustrative embodiments address the above and other challenges by providing techniques for a communication network (e.g., 5G core network) to challenge an NF once any suspicious activity is detected and to take remedial actions to prevent any attacks. Thus, in one illustrative embodiment, when any NF, SCP, SEPP or other network entity detects an attack or finds some suspicious activity by any NF, it informs the NRF via a Service Based Interface (SBI) or OAM. Note that SBI is an API based communication that can take place between two network entities within a 5G SBA. The NRF is informed of, or otherwise discovers, the suspicious NF and challenges the NF to determine whether it is a rogue NF or not. Based on operator policy and NRF challenge results, the NRF can take one or more remedial actions to prevent the rogue NF from being able to perform any further malicious activity within the core network or elsewhere. Examples of such remedial actions may include, but are not limited to, blocking a discovery/token request from the rogue NF, deleting a virtual machine (VM) or container hosting the NF. As such, further attacks by the rogue NF, which can target other NFs, can be prevented.

Figure 4:
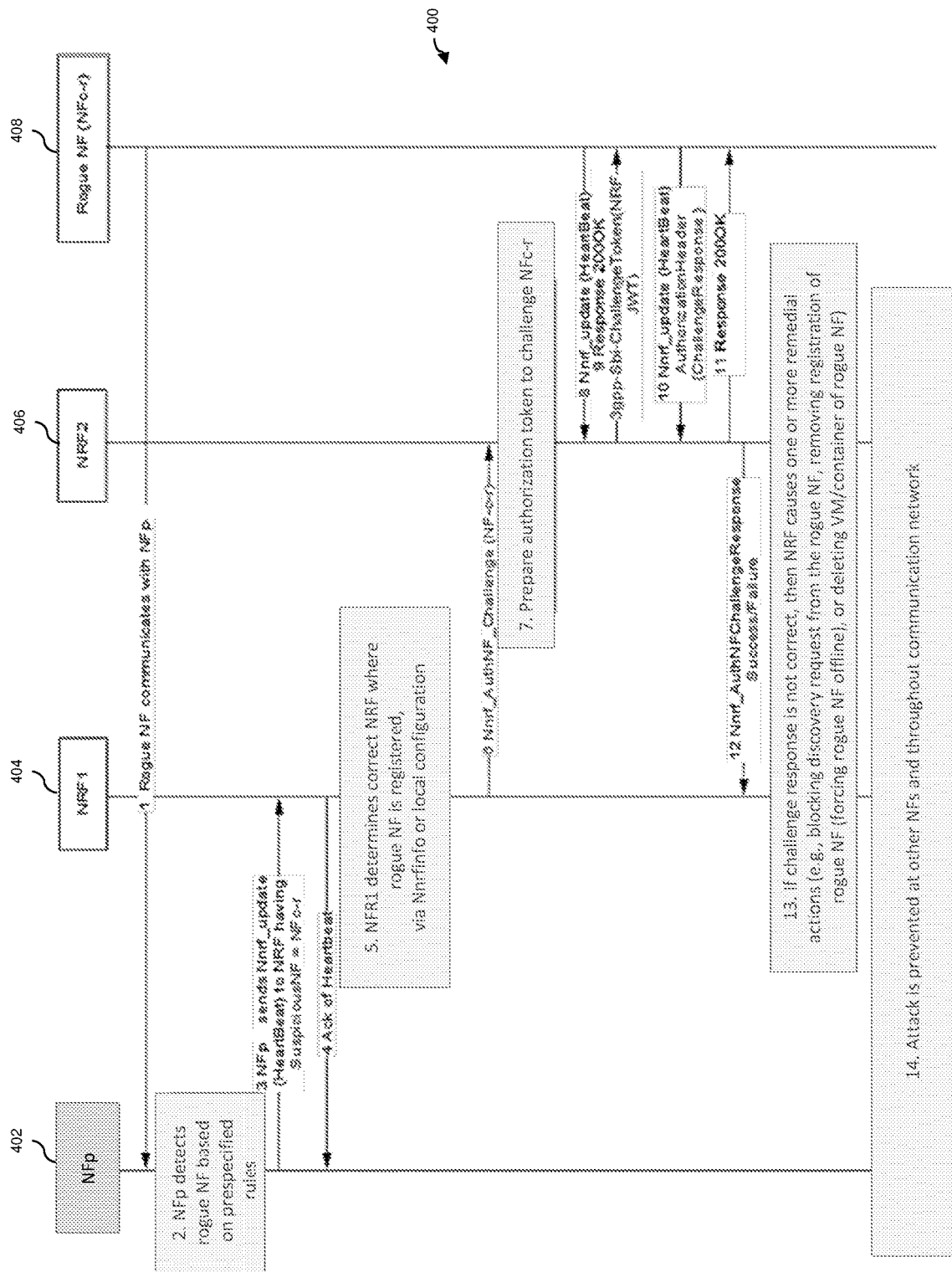
FIG. 4 illustrates a methodology for preventing a rogue network function, according to an illustrative embodiment.

FIG. 4 illustrates a methodology 400 for preventing a rogue network function, according to an illustrative embodiment. As illustratively depicted, methodology 400 involves a producer NF 402 (NFp), a first NRF (NRF1) 404, a second NRF (NRF2) 406, and a rogue consumer NF 408 (NFc-r).

In step 1, NFc-r 408 communicates with NFp 402.

In step 2, NFp 402 detects that NFc-r 408 is a rogue NF based on prespecified rules. For example, assume that NFp 402 suspects that NFc-r 408 is a rogue NF based on an excessive number of messages received from NFc-r 408, wherein the messages are part of a denial-of-service (DoS) attack. The DoS attack can be recognized by NFp 402 based on a locally stored policy, e.g., policy defines a message quantity threshold above which is considered a DoS attack (and/or any other policy mentioned herein or otherwise).

In step 3, NFp 402 informs NRF1 404 by sending a heartbeat (Nnrf_Update) message to NRF1 404. The heartbeat message can be sent every 5-10 seconds. In the heartbeat message sent in step 3, NFp 402 sends a Suspicious_NF_List to NRF1 404 which includes NFc-r 408 details. Note that the message from NFp 402 informing NRF1 404 about the suspicious activity of NFc-r 408 can be any message type other than a heartbeat message or a list (e.g., a Nnrf update message). In some illustrative embodiments, the message of step 3 can be sent by NFp 402 to NRF1 404 via the SBI interface or an OAM node.

In step 4, NRF1 404 sends an acknowledgment (Ack) back to NFp 402.

More generally, when any network entity (e.g., NF, SCP, SEPP) detects an attack or finds some suspicious activity, it can inform NRF1 404 via the SBI interface, OAM, or some other manner. Note that if an attack or suspicious activity is detected by NRF1 404 itself, then steps 3 and 4 need not be performed.

In order for NRF1 404 to challenge NFc-r 408 to check if it is a rogue NF or a genuine NF, in step 5, NRF1 404 first determines the correct NRF where rogue NFc-r 408 is registered (NRF2 406 in this example). NRF1 404 can determine the correct NRF via local configuration or via available Nnrfinfo from other NRFs. In an alternative embodiment, a discovery result can be optimized to return NRF-fqdn in the discovery response so that NRF1 404 knows the NRF with which NFc-r 408 is registered, i.e., NRF2 406.

In step 6, NRF1 404 challenges NFc-r 408 by sending a Nnrf_AuthNF_Challenge message via the SBI interface to NRF2 406. If rogue NFc-r 408 is registered with NRF1 404, then this step is not performed (because NRF1 404 will interact with NFc-r 408).

In step 7, NRF2 406 prepares an authorization token to challenge NFc-r 408. In one illustrative embodiment, the authorization token used to challenge and attempt to re-authorize NFc-r 408 is a JavaScript Object Notation (JSON) Web Token (JWT). Examples of claims included in the JWT token include, but are not limited to: (i) Issuer set to NRF identity (NRF2 instance Id); (ii) Audience set to NF service consumer identity (NRF2 instance Id); (iii) Scope set to new value of NRFbasedChallenge; (iv) Subject: optional claim freely chosen by NRF (for example, identifier to enable NRF to validate response from NFc-r); (v) RandomNumber=Random Number generated by NRF2; (vi) SecretNumber=+5; (vii) Signature of the executable image; and (viii) Other parameters as appropriate.

The JWT token can be signed, i.e., in one illustrative embodiment, a JSON Web Signature (JWS) structure conforming to Internet Engineering Task Force (IETF) Request for Comment (RFC) 7515, the disclosure of which is incorporated by reference herein in its entirety. In another illustrative embodiment, the NF service consumer may encrypt the JWT to generate a JSON Web Encryption (JWE) structure conforming to IETF RFC 7516, the disclosure of which is incorporated by reference herein in its entirety.

Still further, in some embodiments, NRF2 406 includes a cryptographically protected generated token value (e.g., in an encrypted format) in a 3GPP custom header '3gpp-Sbi-NFAuthToken' in any request/response sent towards NFc-r 408, e.g., defined as follows:

(i) The encoding of the header follows the Augmented Backus-Naur Form (ABNF) as defined in IETF RFC 7230, the disclosure of which is incorporated by reference herein in its entirety: 3gpp-Sbi-NFAuthToken="3gpp-Sbi-NFAuthToken:" SP TokenString.

(ii) Mandatory structured parameter, which in the actual header is replaced by its sub-parameters: Token String=string ";". One example includes: 3gpp-Sbi-NFAuthToken: Bearer <jwt-value>.

Then, in response to a Nnrf_update (heartbeat) message from NFc-r 408 in step 8, NRF2 406 sends the challenge message with the authorization token to NFc-r 408 in step 9. Alternatively, NRF2 406 can send the challenge message with the authorization token to NFc-r 408 without having received a heartbeat message from NFc-r 408.

Assume that NFc-r 408 decrypts the token via the public key of NRF2 406 and changes the RandomNumber value by adjusting the SecretNumber (+5), and encrypts it again with the public key of NRF2 406. NFc-r 408 sends the generated token in the next heartbeat message sent to NRF, as shown in step 10.

Alternatively, in some embodiments, each NF can register with an NRF with a ChallengeCallBackURI=URI_Of_NF format. The NRF then uses the same format to send a challenge to the NF.

All fields/claims (or some predetermined subset of fields/claims) from the token are validated by the NRF2 406. If the token is found to be tampered or claims are invalid or expired, NRF2 406 assumes that the NFc-r is rogue NF, otherwise, it is not.

Alternative re-authorization procedures and mechanisms are contemplated in alternative embodiments.

In step 11, NRF2 406 sends an error message to NFc-r 408, if found to be rogue, in the response to heartbeat request.

In step 12, NRF2 406 notifies NRF1 404 about the results (success or failure) of the authorization challenge (re-authorization) such that NRF1 404 knows if NFc-r 408 is rogue (re-authorization failure) or not (re-authorization success).

In step 13, NRF1 404 and/or NRF2 406 can take or otherwise cause remedial actions when NFc-r 408 is identified as rogue. By way of example only, an NRF can block the discovery request and access token request from NFc-r 408, and remove the subscription request from NFc-r 408. Therefore, NFc-r 408 cannot further retrieve the active NFs list from an NRF and further attack can be prevented. Additional remedial actions can be performed. If the rogue NF is registered in the NRF, that registration can also be removed from the NRF. An NRF can also update the OAM node, so that operators can take further action to block the rogue NFs at different NFs/gateways. Additionally or alternatively, a TLS certificate can also be revoked by the OAM node or the Certificate Authority (CA). In yet another alternative embodiment, the OAM node can update the information regarding rogue NFs to all the NFs prone to the attack or the OAM can even delete the VM hosting the NF to protect the entire network. Further remedial action can include an NRF removing the existing subscription request from a rogue NF and any new subscription request from the roque NF can be blocked.

In one or more alternative embodiments, a solution can also be based on a Network Data Analytics Function (NWDAF) where an NF updates the NWDAF about the suspicious NF list so that the NWDAF, based on an operator policy, can further take action to block the rogue NF or even send an alert for deleting the rogue NF. To facilitate the same, the NWDAF can inform OAM and the OAM can update the rogue NF list in each NF prone for the attack.

In step 14, NFs and the core network are now protected against attacks from NFc-r 408.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. The determination and classification of the rogue behavior could be either manual or automatic based on the observed pattern of NF behavior. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

We claim:

1. An apparatus, comprising:
at least one processor; and
at least one memory storing instructions that, when executed by the at least one processor, cause the apparatus at least to:
obtain, by a first network repository function within a communication network, information identifying a network function within the communication network suspected of malicious activity, wherein the communication network corresponds to a core network in 5G;
identify, by the first network repository function, a second network repository function in which the network function suspected of malicious activity is registered with;
initiate, by the first network repository function, a re-authorization of the network function suspected of the malicious activity, wherein the re-authorization comprises:
based on the network function suspected of malicious activity being registered to the second network repository function, sending, by the first network repository function to the second network repository function, a challenge for the network function suspected of malicious activity; and
receiving, by the first network repository function, a response from the second network repository function with respect to the challenge, the response comprising an indication that the network function suspected of malicious activity failed the re-authorization based at least on the network function suspected of malicious activity failing to validate one or more fields of an authorization token sent with the challenge; and
in response to the validation response indicating the failed re-authorization, take remedial actions within the core network to prevent the network function that failed the re-authorization from accessing all other network entities and network functions in the core network including the network entities and network functions not registered to the first network repository function, the remedial actions comprising: blocking discovery requests from the network function that failed the re-authorization, blocking access token requests from the network function that failed the re-authorization, removing or blocking a subscription request for the network function that failed re-authorization, notifying an operations entity, an administration entity, and a management entity regarding the network function that failed re-authorization, and causing a virtual machine hosting the network function that failed re-authorization to be deleted.

2. The apparatus of claim 1, wherein validation of the authorization token includes validation of all fields of claims of the authorization token.

3. The apparatus of claim 1, wherein obtaining information identifying the network function suspected of malicious activity further comprises receiving, from at least one network entity in the communication network, a message identifying the network function suspected of malicious activity operating within the communication network.

4. A method comprising:
obtaining, by a first network repository function within a communication network, information identifying a network entity within the communication network suspected of malicious activity operating within the communication network, wherein the communication network corresponds to a core network in 5G;
identifying, by the first network repository function, a second network repository function in which the network entity suspected of malicious activity is registered with;
executing, by the first network repository function, a re-authorization of the network entity suspected of the malicious activity, wherein the re-authorization comprises:
based on the network entity suspected of malicious activity being registered to the second network repository function, sending, by the first network repository function to the second network repository function, a challenge for the network entity suspected of malicious activity; and
receiving, by the first network repository function, a response from the second network repository function with respect to the challenge, the response comprising an indication that the network entity suspected of malicious activity failed the re-authorization based at least on the network entity suspected of malicious activity failing to validate one or more fields of an authorization token sent with the challenge; and
in response to the validation response indicating the failed re-authorization taking remedial actions to occur within the communication network to prevent the network entity that failed re-authorization from accessing any other network entities in the communication network including network entities and network functions not registered to the first network repository function, the remedial actions comprising: blocking discovery requests from the network function that failed the re-authorization, blocking access token requests from the network function that failed the re-authorization, removing or blocking a subscription request for the network function that failed re-authorization, notifying an operations entity, an administration entity, and a management entity regarding the network function that failed re-authorization, and causing a virtual machine hosting the network function that failed re-authorization to be deleted; and wherein the obtaining and causing steps are performed in accordance with at least one processor and at least one memory including computer program code.

5. The method of claim 4, wherein the network entity corresponds to a network function.

6. A non-transitory computer readable medium comprising program instructions that, when executed by an apparatus, cause the apparatus to perform at least the following:
obtaining, by a first network repository function within a communication network, information identifying a network entity within the communication network suspected of malicious activity operating within the communication network, wherein the communication network corresponds to a core network in 5G;
identifying, by the first network repository function, a second network repository function in which the network entity suspected of malicious activity is registered with;
executing, by the first network repository function, a re-authorization of the network entity suspected of the malicious activity, wherein the re-authorization comprises:
based on the network entity suspected of malicious activity being registered to the second network repository function, sending, by the first network repository function to the second network repository function, a challenge for the network entity suspected of malicious activity; and
receiving, by the first network repository function, a response from the second network repository function with respect to the challenge, the response comprising an indication that the network entity suspected of malicious activity failed the re-authorization based at least on the network entity suspected of malicious activity failing to validate one or more fields of an authorization token sent with the challenge; and
in response to the validation response indicating the failed re-authorization taking remedial actions within the communication network to prevent the network entity that failed re-authorization from accessing any other network entities in the communication network including network entities and network functions not registered to the first network repository function, the remedial actions comprising: blocking discovery requests from the network function that failed the re-authorization, blocking access token requests from the network function that failed the re-authorization, removing or blocking a subscription request for the network function that failed re-authorization, notifying an operations entity, an administration entity, and a management entity regarding the network function that failed re-authorization, and causing a virtual machine hosting the network function that failed re-authorization to be deleted.

* * * * *